United States Patent [19]

Janusz

[11] Patent Number: 5,138,800
[45] Date of Patent: Aug. 18, 1992

[54] POSITIONING APPARATUS FOR SUPPORTING AND GUIDING A TOOL

[75] Inventor: Mark Janusz, Montreal, Canada

[73] Assignee: Compustrip Systems Ltd., Montreal, Canada

[21] Appl. No.: 693,613

[22] Filed: Apr. 30, 1991

[51] Int. Cl.[5] .............................................. B24B 49/00
[52] U.S. Cl. ............................ 51/165.71; 51/165.74; 51/165.77; 51/424; 51/429; 51/439
[58] Field of Search ................. 51/180, 410, 424, 427, 51/429, 439, 166 R, 166 TS, 166 FB, 317, 318, 319, 320, 321, 165.71, 165.74, 165.76, 165.77

[56] References Cited

U.S. PATENT DOCUMENTS

| | | | |
|---|---|---|---|
| 2,755,606 | 7/1956 | Ronvold | 51/180 |
| 3,908,314 | 9/1975 | Watanabe | 51/429 |
| 3,911,849 | 10/1975 | Hammelmann | 51/429 |
| 3,916,568 | 11/1975 | Rose | 51/429 |
| 3,948,005 | 4/1976 | Whitsett | 51/180 |
| 4,286,417 | 9/1981 | Shelton | 51/429 |
| 4,984,396 | 1/1991 | Urakami | 51/410 |
| 4,987,700 | 1/1991 | Westerman | 51/166 TS |
| 8,303,071 | 9/1983 | Hockett | 51/410 |

Primary Examiner—Bruce M. Kisliuk
Assistant Examiner—B. Bounkong
Attorney, Agent, or Firm—Longacre & White

[57] ABSTRACT

A positioning apparatus for supporting and guiding a tool to effectuate a work function on a predetermined area of a stationary surface. The apparatus comprises a support guide frame which is displaceably connected to a displaceable base. The base is displaceable and positioned to a stationary location relative to the predetermined area. The support guide frame has a pair of spaced-apart side arms each connected at a rear end thereof to the base by a respective pivotal telescopic coupling. The telescopic coupling permits each side arm to be indendently displaced axially and pivotally to one another in parallel vertical planes. A transverse guide beam is secured to the side arms and is axially displaceable relative thereto. A tool carriage is secured to the guide beam and controllably displaced therealong. The carriage has a telescopic support member axially displaceable in a vertically pivotal bushing. A tool is attached to the support member and is operable by manual controls by an operator for initial positioning to the surface to be worked. The maintenance task proceeds by automatic control from thereon.

20 Claims, 7 Drawing Sheets

POSITIONING APPARATUS FOR SUPPORTING AND GUIDING A TOOL

BACKGROUND OF INVENTION

1. Field of the Invention

The present invention relates to a positioning apparatus for supporting and guiding a tool to effectuate an automated work function on a predetermined area of a stationary surface and in particular, for positioning a paint stripping tool to strip paint with automated controls from the surface of aircrafts.

2. Description of Prior Art

Various types of machines and automated installations have been proposed or provided whereby to effect work functions on aircrafts such as to paint or wash an aircraft. Most of these installations and apparatuses are complex in construction, costly, and occupy large fixed spaces in a hangar. Manual operations are also very time-consuming and this results in aircrafts being grounded for long periods of time which adds to the cost of effectuating a work function on the aircraft.

Methods now being used to strip paint manually from aircrafts utilize chemicals which release toxic fumes thereby causing pollution and are hazardous to the people effectuating the work function. They are also labour and time intensive as it is usually necessary to set up scaffolding on various parts of an aircraft in order to strip the surface coatings therefrom. The process also produces a lot of debris which must be cleaned from the aircraft and the floor of the hangar. These toxic chemicals are applied under low pressure and are not compatible with composite structures. A limited number of aircraft have been stripped by manual, open-blast application or a dry media, but to avoid damage to be caused to the aircraft, it is necessary to have expertly trained personnel on such new processes. Also dedicated facilities are usually required because the reusable blast means under pressure can fly out in all directions in the work area and can enter vital exposed parts of an aircraft, such as the engines, the flap control mechanisms, etc. After the aircraft has been stripped of its surface paint, it is then necessary to clean the air craft of dust particles and chemicals that have settled thereon and to clean the floor surface under the aircraft. This added work is very time and labour intensive and can also be hazardous to the operators and, therefore, they need to wear filter masks in order not to breathe the dust particles; it can also be a cause of contamination of the reusable media.

If the skin of the aircraft requires inspection, this is again a time consuming and labour intensive process and such inspection is dependent on the skills of the operators and errors in the inspection technique and interpretation of results can occur. There is therefore a requirement to provide an apparatus which is substantially automatic and which can effect precise job functions on the aircraft surface and which is simple to operate, less expensive than prior art methods, which is accurate, and which can work in all exterior parts of an aircraft and wherein more than one apparatus can work on an aircraft at the same time whereby to reduce the down time of the aircraft.

SUMMARY OF INVENTION

It is therefore a feature of the present invention to provide a positioning apparatus for supporting and guiding a tool to effectuate a work function on a predetermined area of a stationary surface and which substantially overcomes the above-mentioned disadvantages of the prior art.

Another feature of the present invention is to provide a positioning apparatus for supporting and guiding a dry stripping tool to strip surface coatings on the outer skin of an aircraft and wherein the dry abrasive particles used are recovered and recycled as well as substantially all of the dust and paint particles generated during the stripping operation.

Another feature of the present invention is to provide a positioning apparatus for supporting and guiding a tool to effectuate a work function which is automatically controlled by a single operator and wherein the apparatus is secured to a displaceable base positioned at a stationary location relative to a predetermined area where the work function is to be effectuated and wherein more than one apparatus can be utilized at the same time to effectuate work functions on the same aircraft.

Another feature of the present invention is to provide a positioning apparatus for supporting and guiding a tool such as a paint stripping tool, a buffing tool, paint spraying tool, an inspection tool, a washing tool, etc. and wherein said tool is guided on a predetermined area of the outer skin of an aircraft to effectuate a work function.

Another feature of the present invention is to provide a positioning apparatus for supporting and guiding a tool to effectuate a work function on a predetermined area of a stationary surface and wherein the apparatus is mobile, inexpensive, is compact and accordingly does not occupy much space, is easy to operate and maintain and can be adapted to effectuate work functions on many objects of large or small sizes and wherein the tool is automatically operated.

According to the above features, from a broad aspect, the present invention provides a positioning apparatus for supporting and guiding a tool to effectuate a work function on a predetermined area of a stationary surface. The apparatus comprises a support guide frame displaceably connected to a displaceable base. Means is provided to displace and position the base to a stationary location relative to the predetermined area. The support guide frame has a pair of spaced-apart side arms each connected at a rear end thereof to the base by a respective pivotal telescopic coupling. The telescopic coupling permits each side arm to be independently displaced axially and pivotally to one another in parallel vertical planes. A transverse guide beam is secured to a front end of the side arms through an axial connection to permit axial displacement of the guide beam when the side arms are offset from a common horizontal plane to locate the guide beam at an angle. A tool carriage is secured to the guide beam and controllably displaced therealong. The carriage has a telescopic support member axially displaceable in a vertically pivotal bushing. Attachment means is provided to secure a tool to an attachment end of the support member. Control means is provided to displace the support guide frame and carriage moving parts to guide the tool in a controlled manner over the predetermined area.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
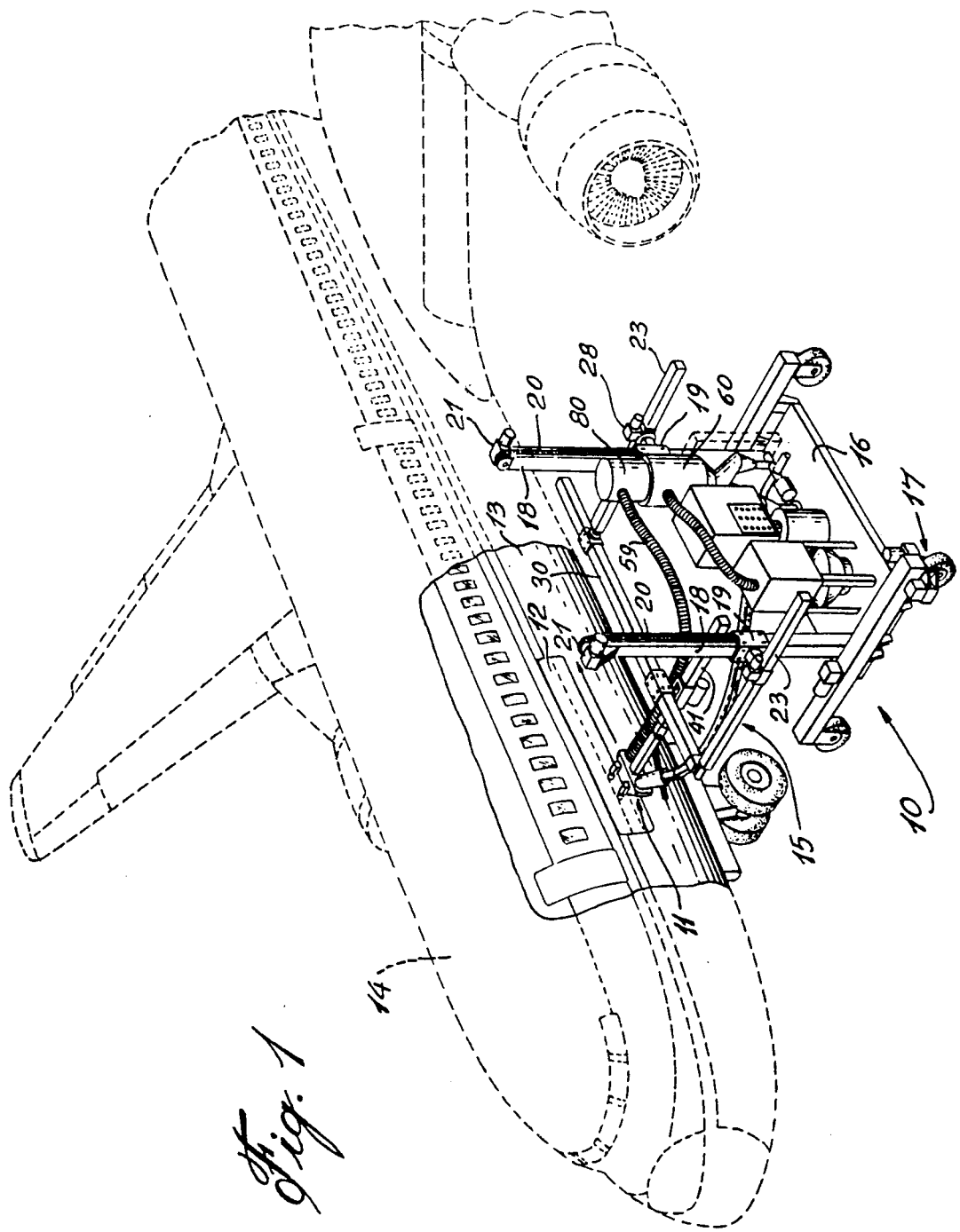
FIG. 1 is a perspective view of the positioning apparatus of the present invention which is herein shown as positioning a dry abrasive paint stripping tool to effectuate a work function on a predetermined area of an aircraft.

Referring now to the drawings, and more particularly to FIG. 1, there is shown generally at 10, the positioning apparatus of the present invention which supports and guides a tool 11, herein a dry abrasive paint stripping tool, to effectuate a work function on the predetermined area 12 on the outer skin 13 of an aircraft 14.

The apparatus comprises essentially a support guide frame 15 which is displaceably connected to a displaceable base 16 which is supported on a floor by bearing means, herein two sets of motorized wheels 17 on each side of the base 16. A pair of parallel vertical posts 18 are secured in aligned relationship and extend from the displaceable base whereby to support the guide frame 15. The guide frame 15 is secured to the vertical posts by pivotal telescopic couplings 19, which will be described in detail later, with the couplings being displaced along the posts by a chain linkage 20 which is motor driven by the motor 21 secured to the top end of the vertical posts 18.

Figure 7:
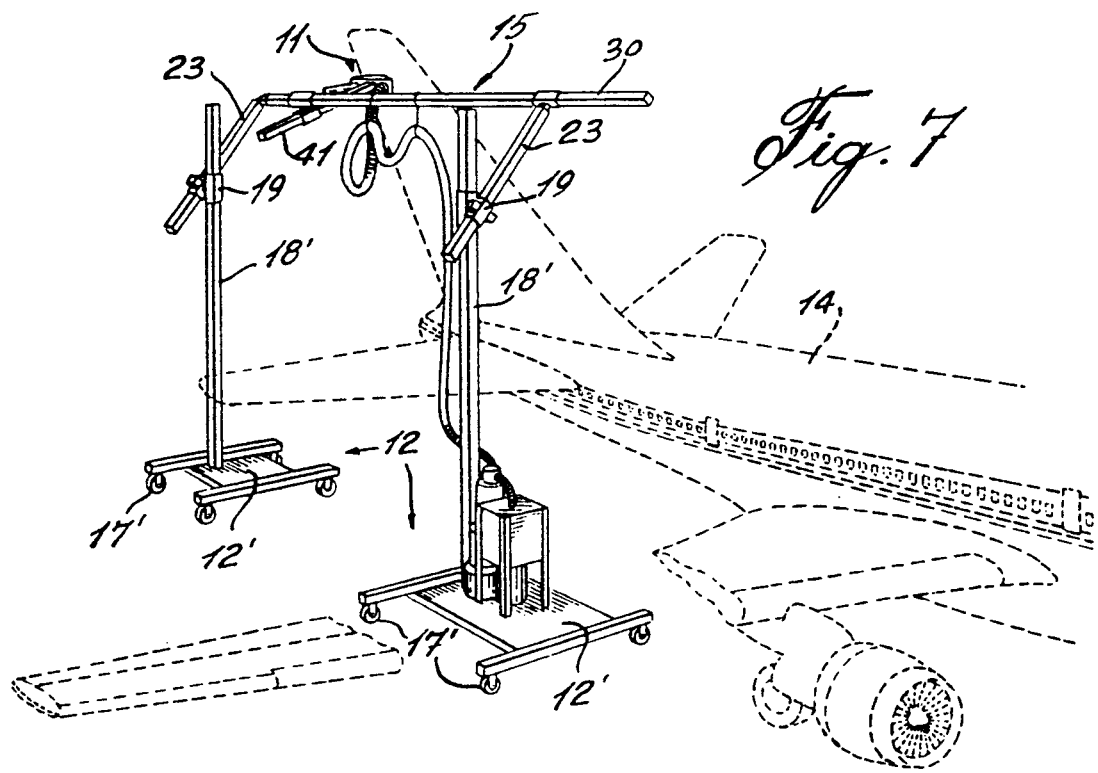
FIG. 7 is a perspective view showing a different configuration of the apparatus wherein the support columns for the guide frame are set-up on two separate "displaceable bases"
Figure 8:
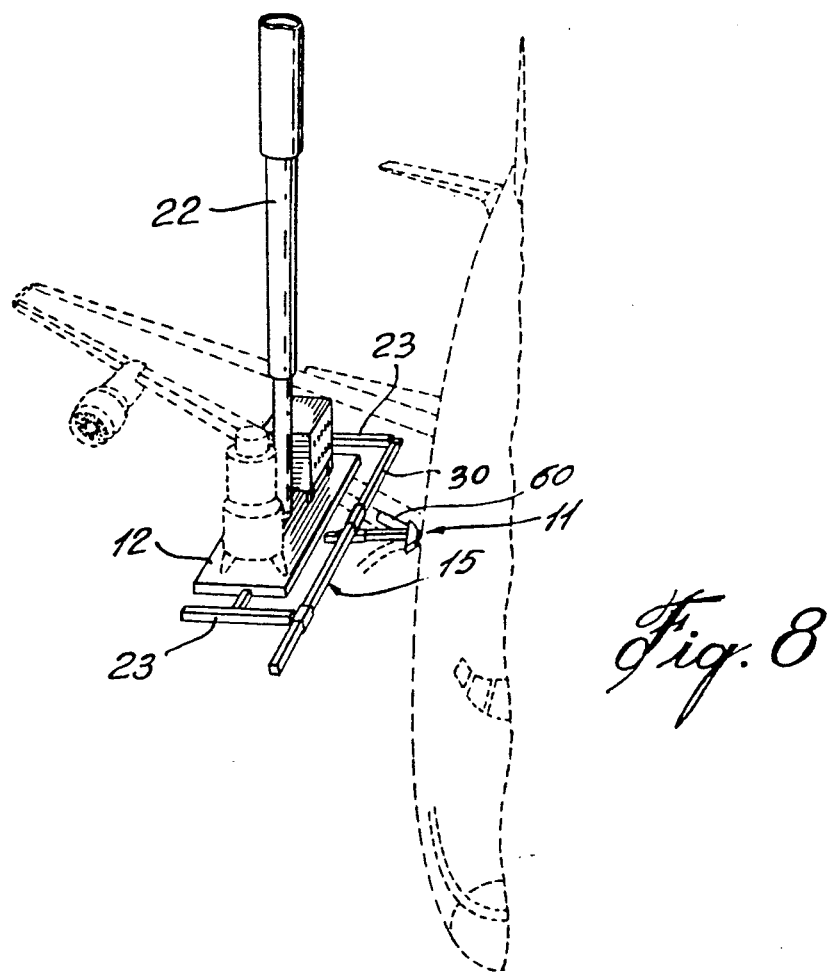
FIG. 8 is a perspective view showing a still further configuration of the apparatus wherein the support guide frame is secured to a displaceable overhead mechanism to suspend the guide frame.

As shown in FIG. 7, the displaceable base 12 is herein comprised of two base sections 12' which are independent from one another and each supported on the floor by casters 17'. Each base section 12' has a vertical support post 18' which extends vertically thereabove and each having the pivotal telescopic coupling 19 secured thereto to support the support guide frame 15. FIG. 8 shows another modification to the positioning apparatus and wherein the support guide frame 15 is secured to a displaceable overhead mechanism 22 to suspend the base 12 from a ceiling structure (not shown) to effectuate a work function from overhead. Control equipment (not shown) would be located on the floor surface to control the position of the working tool 11 on the aircraft 14 or other object requiring a work function.

Figure 5:
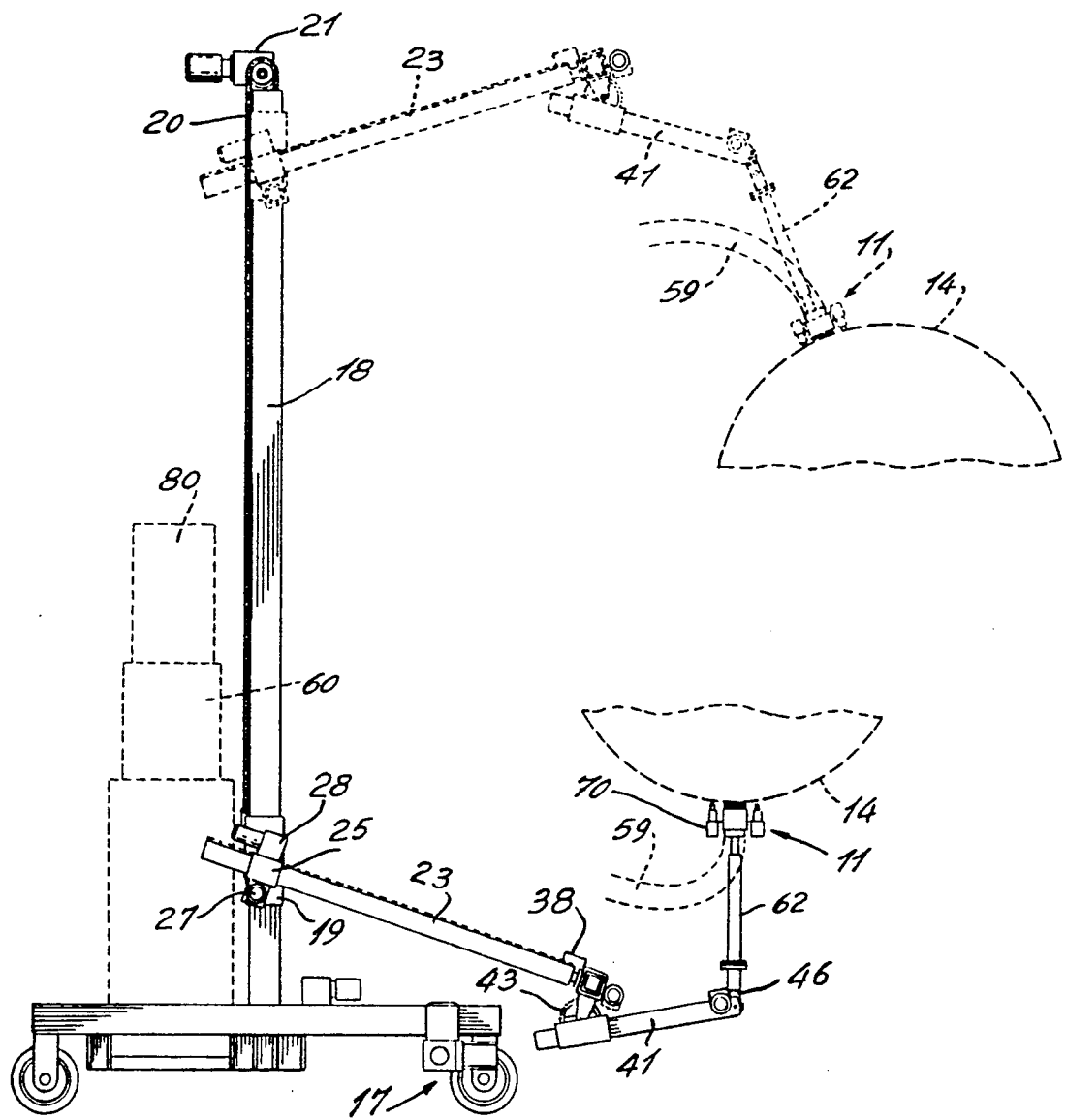
FIG. 5 is a side view, similar to 4, and showing still further configurations of the guide frame with the side arms positioning the paint stripping tool under and over an aircraft fuselage.

Referring now more specifically to FIGS. 1 to 5, there will be described the detailed construction of the support guide frame 15 of the present invention. As herein shown, the guide frame comprises a pair of spaced-apart side arms 23 which are connected to the vertical posts 18 by the pivotal telescopic coupling 19, as previously described. The telescopic coupling is better illustrated in FIG. 4 and it consists of a sleeve bushing 24 which is fitted about the vertical posts 18 and displaceable therealong by the chain drive, as shown in FIG. 1. A side arm support bracket 25 is secured to the sleeve bushing and receives a respective one of the side arms 23 for axial displacement therewith by automatically controlled displacement means herein constituted by a rack and drive pinion. The pinion is driven by a stepping motor 28 secured to the support bracket 25 to engage the toothed rack 26 provided on the side arm 23. The support bracket 25 is also pivotally connected to the sleeve bushing and displaceable by an arcuate gear arrangement (not shown) whereby to position the side arms at varying angles to the horizontal, as shown in FIG. 5. This displacement is effectuated by a further stepping motor 27, as shown in FIG. 5. Such articulated support bracket is particularly useful with the support arrangement as shown in FIG. 8 where one of the side arms 23 can be positioned angled downwardly and the other side arm positioned angled upwardly whereby the guide beam 30 can be positioned at an angle. Accordingly, it can be seen that the telescopic coupling 19 permits each of the side arms 23 to be independently displaced axially in the direction of arrows 29 and also pivotally to one another in parallel vertical planes.

Figure 2:
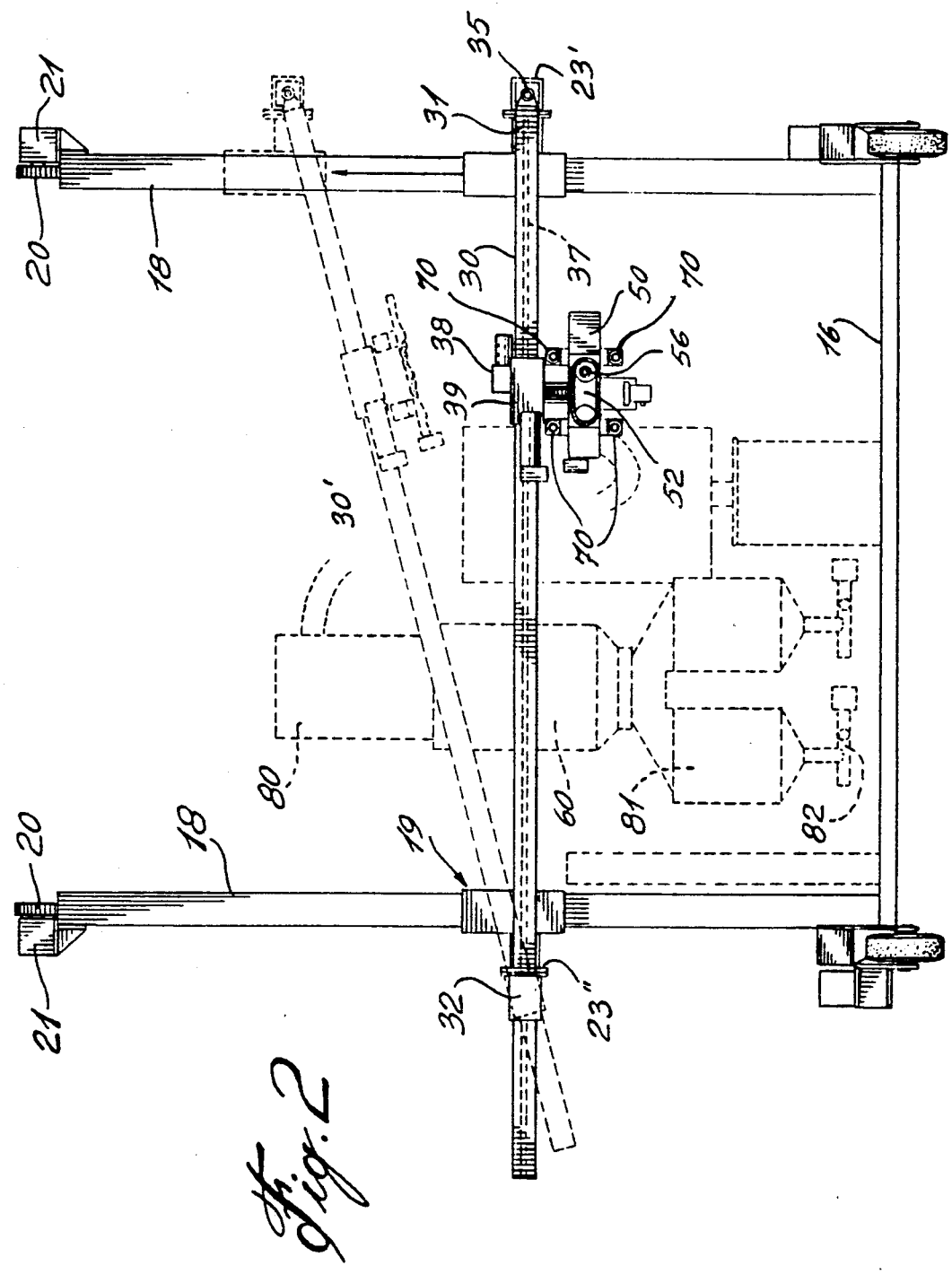
FIG. 2 is a front view of the apparatus showing the angular displacement of the guide beam.

The transverse guide beam 30 is secured to a front end of each of the side arms 23 through an axial connection to permit axial displacement of the guide beam when the side arms are offset from a common horizontal plane, that is, at various angles to one another in their vertical planes whereby to locate the guide beam at an angle, as clearly illustrated in FIG. 2 at the phantom line position 30'. By using two base sections, as shown in FIG. 7, it is possible to interchange the guide beam for shorter or longer beams.

The axial connection of the guide beam to the front end of the side arms is constituted by an articulated connector 35, as better seen in FIG. 2 fixed to an end of one of the side arms, herein side arm 23', and the end 31 of the guide beam 30. The connector 35 may be a ball and socket connector, as is well known in the art.

A slide connector constituted by a slide bushing 32 is secured to the opposed end of the other side arm 23", and also has an articulated connection to permit the beam 30 to be at angles, as shown in FIG. 2. Accordingly, the guide beam is slidingly received within the bushing 32 for sliding axial displacement therein.

Figure 3:
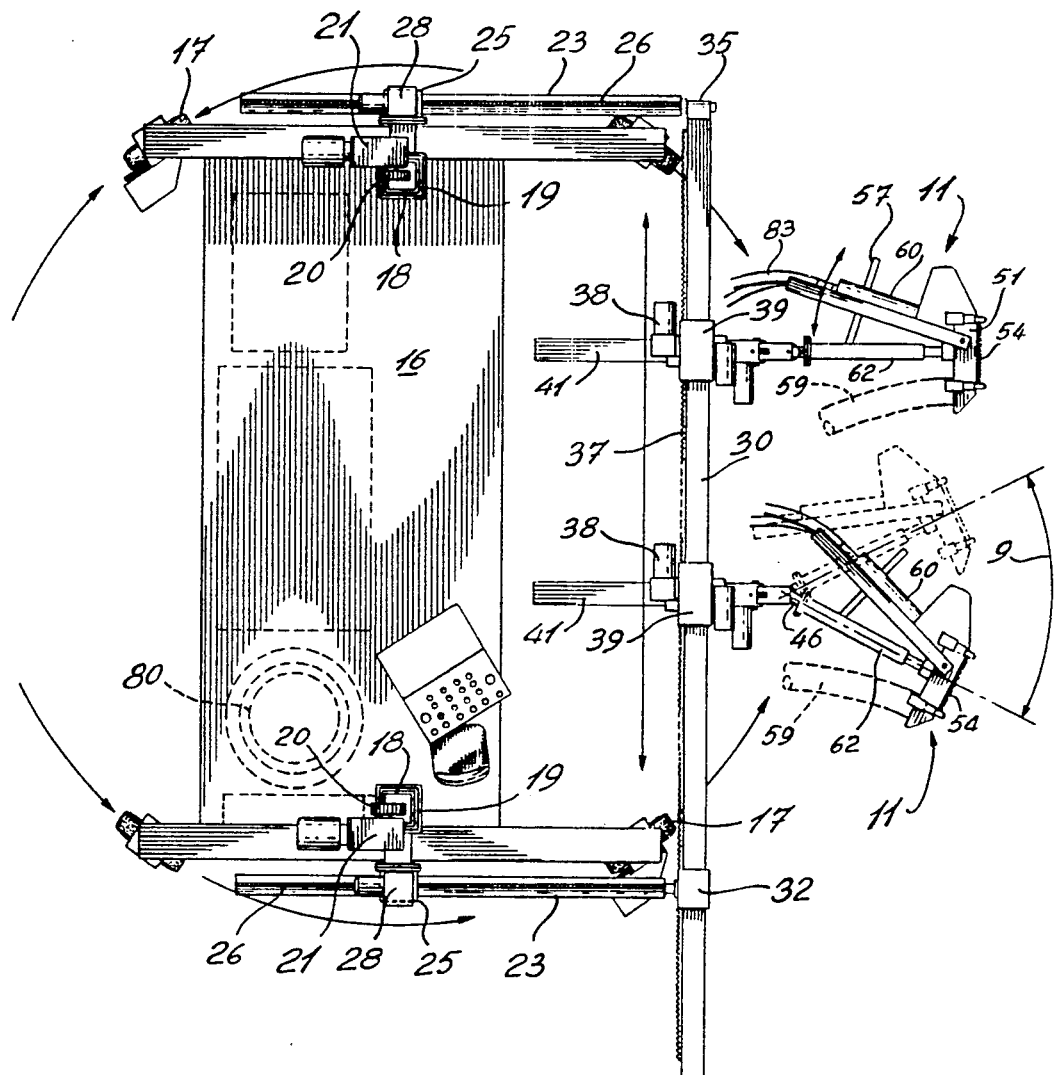
FIG. 3 is a top view of the apparatus showing a pair of paint stripping tools secured to the guide beam.
Figure 4:
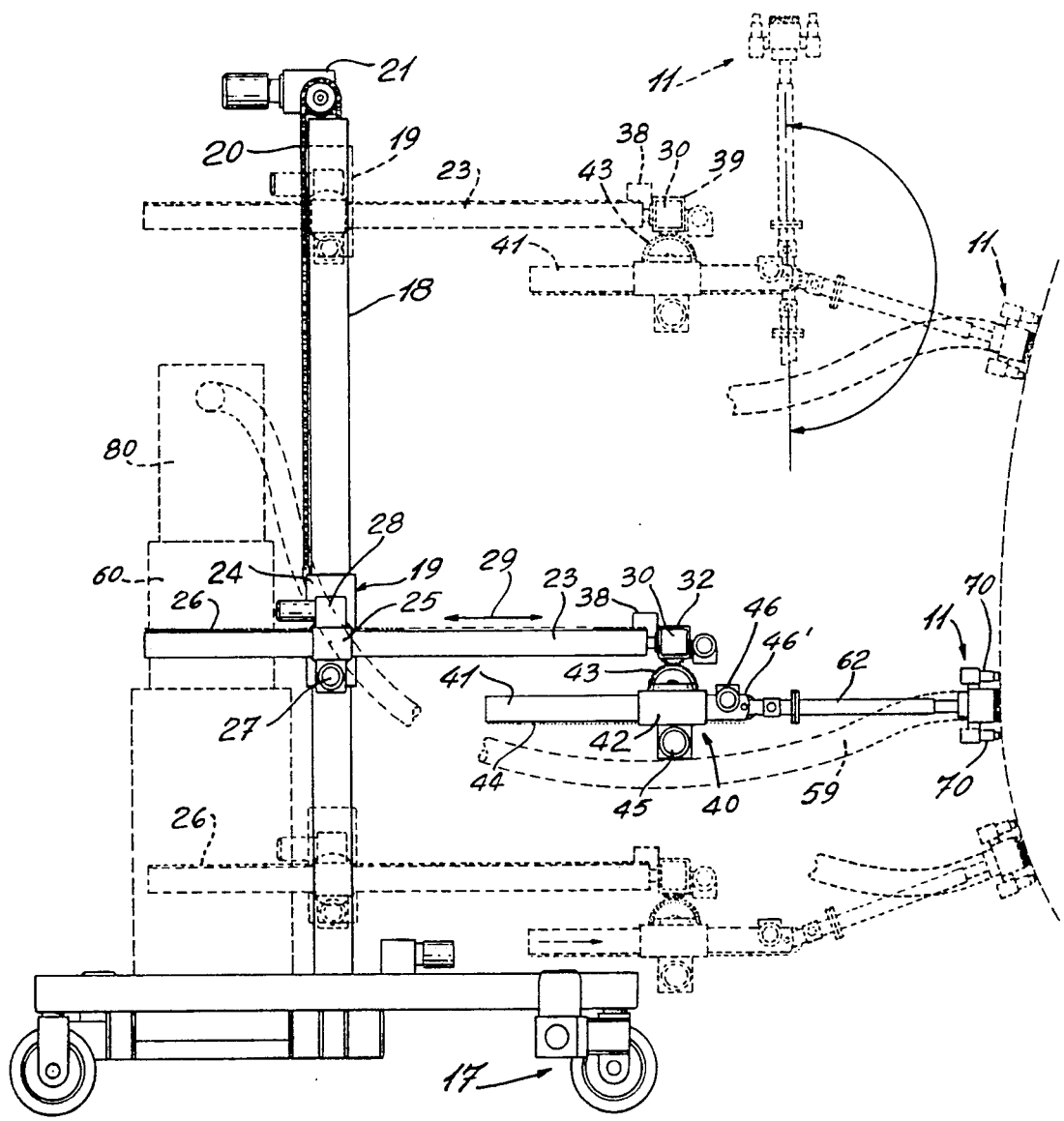
FIG. 4 is a side view, partly fragmented, showing the construction of the support guide frame in various positions of the paint stripping tool.

A tool carriage 40 is secured to the guide beam 30 by a sleeve coupling 39 which supports a stepping motor 38 and which provides a drive for a rack and pinion coupling between the sleeve 39 and the guide beam 30. The rack as mounted on the beam is illustrated at 37. Accordingly, the position of the tool carriage 40 is controlled along the guide beam. The tool carriage 40 has a telescopic support arm 41 which is axially displaceable in a vertically pivotal bushing 42. The vertically pivotal bushing 42 is a sleeve which is provided with an arcuate gear coupling 43, herein schematically illustrated, to gear couple same with the sleeve coupling 32 displaceable along the guide beam 30 so as to displace the vertical pivotal bushing 42 along an arc which extends below and above the horizontal axis of the vertical pivotal bushing which is also positioned at a desired angle relative to the guide beam 30. The telescopic support arm which is received within the sleeve 42 is displaceable therein by a motor driven rack and pinion coupling operated by the motor 45 which drives the pinion in toothed engagement with the rack 44. The free end of the telescopic support arm 41 is provided with attachment means, herein a gear 46' driven by motor 46" to the end of the 46 to secure a work tool to the end of the support arm 41 and to displace arcuately on a vertical plane 90°, up and down from horizontal joint 46, as shown in FIG. 3, is also motor driven and displaces tool along arc 9 in a horizontal plane. The sensors 70 control the telescopic displacement of the support arm 41 and the arcuate displacement of the tool 11.

Figure 6A:
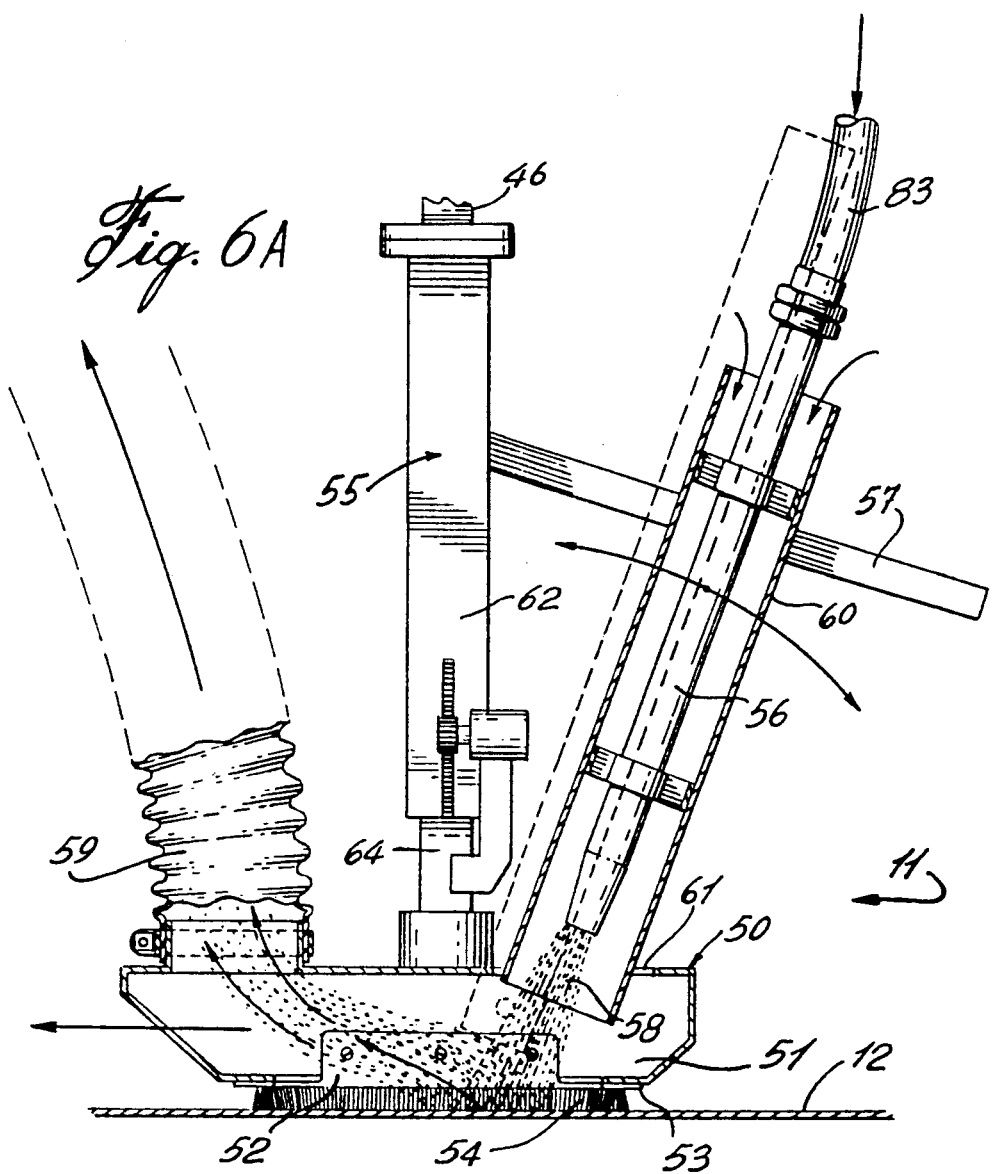
FIG. 6A is a fragmented top view showing the construction of the dry abrasive paint stripping tool of the present invention.
Figure 6B:
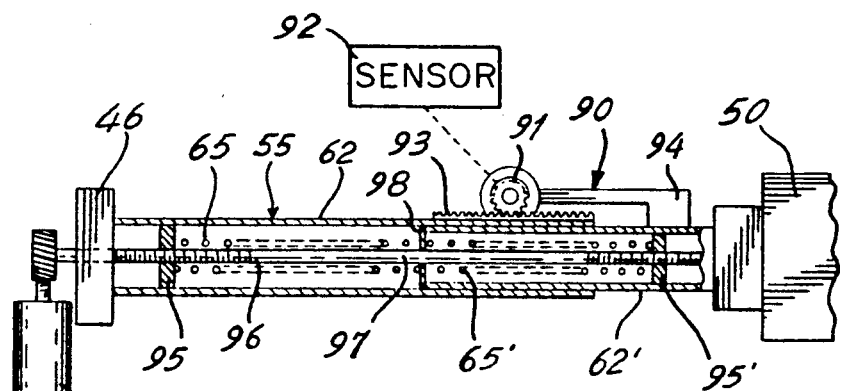
FIG. 6B is a fragmented section view of the gravity load-equalizing adaptor of FIG. 6A.

Referring now to FIGS. 6A and 6B, there will be described the construction and operation of the dry abrasive paint stripping tool 11. As herein shown, this tool is comprised of a head or housing 50 defining a chamber 51 therein. The head has an opening 52 in a flat frontal wall 53 thereof. A flexible sealing means in the form of a bristle ribbon 54 is secured about the opening 52. The housing or head 50 is connected to the attachment means 46 through a gravity load equalizing adaptor 55. One or more abrasive jets 56 are adjustably secured to a support frame 57 to direct the jet stream 58 at an angle with respect to the surface area 12 on which a work function is to be performed. These jet particles impinge upon the surface area 12 to remove the paint coating thereon, and the particles bounce off into the chamber 51 and are sucked away through a vacuum hose 59 which connects to a vacuum pump and reservoir apparatus 60, as shown in FIG. 1. Air is admitted into the chamber 51 through the cylinder 60 in which the nozzle 56 is connected. The bristle ribbon 54 prevents abrasive and dust particles from being ejected out of the housing, and also admits air therethrough due to the suction imposed at the chamber 51. However, the majority of the air will enter the chamber through the cylinder 60 connected to the top wall 61 of the housing 50.

The purpose of the load/gravity equalizer 55 is to compensate for the weight of the head 50 and its attachments to the springs 65 and 65' acting on the length tension thereof and as shown in FIG. 6B. Such action occurs when working in the downward or upward positions of the head, such as illustrated in FIG. 5. As shown in FIG. 6B, the load/gravity equalizer consists of telescoping square tubes 62 (the large diameter outer-tube), and inner tube 62' (the smaller diameter inner-tube). Tube 62 is stationary and connected to the arm 41 near the horizontal gear assembly at 46 (see FIG. 5), while the inner-tube 62' is fixed to the tool 50 and is moveable telescopingly disposed inside the outer tube 62. A spring-loaded rod-coupling is fitted into a thrust-bearing at the "drive" end of outer-tube 62 and rests against the inner-tube's tool-end wall. A "rack and pinion" assembly 90 is mounted respectively on the outer-tube 62 and inner-tube 62', the rotation of the pinion 91 is monitored by the rheostat sensor 92 as shown the rack 93 is secured to the outer tube 62 and the pinion 91 is secured to the inner tube 62' by bracket 94.

Moveable, threaded, spring compression-plates 95 and 95' are located (proportionally) near each end of the rod 96 which is threaded, except for its middle-section 97 where it can allow the inside end-wall 98 of inner-tube 62' to slide over it as tube 62' moves in and out inside of tube 62.

A preprogrammed step-motor 99 rotates the rod 96 clockwise or counter clockwise to move the compression-plates 95 and 95' (some direction and some distance) to reposition the rheostat sensor 92 (on rack and pinion assembly 90) to its "zero" reference position after one of the springs 65 and 65' has been "collapsed", prior to "sealing" against the surface (aircraft), because of the weight of the "tool" when the latter is not in the horizontal position. Once the reference position has been re-established by the drive motor 99 and the tool is pushed (sealed) against the surface 12 of the aircraft, the inner-tube 62' is allowed to slide in by $\frac{1}{2}$ inch$\pm\frac{1}{8}$ and maintained there by computer-controlled signals from the rheostat sensor 92 which controls the motor 99.

The inner-tube 62' is pushed in during "sealing" operation of the enclosure against the surface 12. At that time, the displacement of inner-tube 62' is programmed to be maintained at $\frac{1}{2}$ inch$\pm\frac{1}{8}$ inch. The maximum inward displacement of tube 62' is $1\frac{1}{4}$ inch. Beyond this point, the proximity sensors 70 instruct the arm 41 to pull-back to avoid excessive pressure being applied to the surface 12. When the tool and tubes 62 and 62' are positioned horizontally, both springs 65 and 65' are stretched to their "normal" length and the rack-and-pinion assembly 90 and the rheostat sensor 92 is set to the "zero" or "reference" position, before any attempt is made to seal the tool against the surface of the aircraft. When the tool points upward (as shown in FIG. 5), the rheostat reads on non-zero value since the bottom spring 65 has been compressed (shortened) since is it bearing the weight of the tool. The stepping-motor 99 then rotates the piston-rod 96 to move the rear-compression plate 95 and front-one 95' up, and as a result the inner-tube 62' is pushed upward, thereby releasing tension on spring 65' and increasing tension on spring 65 until the "zero" rheostat position is re-established. When the tool points downwards (as shown in FIG. 5), the reverse operation takes place.

As shown in FIG. 1, all of the auxiliary equipment associated with the tool 11 are mounted on the displaceable base stream. A control panel is also mounted thereon and is accessible to an operator. The control panel is a computer controlled panel and provided with hand operable controls (not shown) to control the movement of the tool. A computer program commands the job function and parameters, and will instruct the operator where to position the tool, provide automatic compensation of the position of the head and the pressure applied thereto, and the rate of displacement of the head.

As shown in FIG. 2, a plurality of pressure sensors, herein four sensors 70, are disposed in each corner of the housing 50 and engage the working surface prior to engagement by the bristle ribbon 54 about the opening 52. These sensors provide reference signals concerning the position of the head relative to the outer surface of the aircraft fuselage whereby the outer flat wall 53 of the housing can be oriented substantially parallel to the surface to be stripped. These reference signals are continuously fed to the control computer, and automatic adjustment of the head is effectuated by controlling the stepping motors to displace the telescopic support arm 41. As shown in FIG. 2, the support frame herein supports a reservoir 60 and a dry cyclone 80 which contains the abrasive particles which may be plastic particles, and these are fed to auxiliary auger feeders 82 supplying particles via the hose 83 to a respective one of one or more jets 56 mounted in the paint stripper head 50. Accordingly, the apparatus 10 of the present invention is self-contained, and for this reason, various apparatus can be positioned about an aircraft to effectuate various work functions at the same time thereby cutting down on the down time of an aircraft. Of course, auxiliary electrical power is supplied to the apparatus via an extension cord, and the air compressor can also be mounted on the platform, or air can be supplied to the apparatus by an extension hose.

In conclusion, with the apparatus of the present invention there is provided a modular concept wherein the apparatus is mobile and can adapt to variable structural geometry. The apparatus also does not contact the aircraft on which a work function is to be performed, and can operate either from the floor or from an overhead support mechanism. The tracking of the aircraft shape is done automatically through the use of sensors, and paint can be removed from the skin of the aircraft in a dust-free environment thereby eliminating the need for extensive clean-up after operation and for hazards created to the vital parts of the aircraft by dust deposit, and further provides a more sanitary environment for the worker. Various types of tools can be adapted to the apparatus for paint stripping, for polishing, for painting, for effecting structural inspection to the outer skin of the aircraft, for washing the aircraft, etc. It is also pointed out that the apparatus of the present invention is not limited to effecting work functions on aircrafts, but could be adapted to effectuate work functions on various other objects or surfaces. Accordingly, there is provided an apparatus which is safe, highly productive, simple to operate, and substantially economical to construct, and which can be used to effectuate work functions on small to very large objects, such as a jumbo jet.

I claim:

1. A positioning apparatus for supporting and guiding a tool to effectuate an automated work function in a predetermined area of a stationary surface, said apparatus comprising a support guide frame displaceably connected to a displaceable base, means to displace and position said base to a stationary location relative to said predetermined area, said support guide frame having a pair of spaced-apart side arms each having a front end and a rear end, each connected at a rear end thereof to said base by a respective pivotal telescopic coupling, said telescopic coupling permitting each side arm to be independently displaced axially and pivotally to one another in parallel vertical planes, a transverse guide beam displaceably secured to said front end of said side arms to permit longitudinal axial sliding displacement of said guide beam with respect to one of said front end of said side arms when said side arms are offset from a common horizontal plane to locate said guide beam at an angle, a tool carriage secured to said guide beam and controllably displaced therealong, said carriage having a telescopic support member axially displaceable in a vertically pivotal bushing, attachment means to secure a tool to an attachment end of said support member, and control means to displace said support guide frame and carriage moving parts to guide said tool in a controlled manner over said predetermined area.

2. A positioning apparatus as claimed in claim 1 wherein said support guide frame is secured to a displaceable overhead mechanism to suspend said guide frame at said stationary location.

3. A positioning apparatus as claimed in claim 1 wherein said displaceable base is comprised of two base sections supported on floor bearing means, each of said sections having a vertical support post extending thereabove and to which a respective one of said side arms is connected through said pivotal telescopic coupling.

4. A positioning apparatus as claimed in claim 1 wherein said displaceable base is supported on floor bearing means, said base having a pair of parallel vertical support posts, each of said pivotal telescopic couplings being displaceably connected to a respective one of said vertical support posts by independent drive displacement means.

5. A positioning apparatus as claimed in claim 4 wherein said drive displacement means is a motor driven chain extending along a respective one of said vertical support posts.

6. A positioning apparatus as claimed in claim 4 wherein said telescopic coupling comprises a sleeve bushing positioned about a respective one of said vertical support posts and attached to said drive displacement means, a side arm support bracket secured to said sleeve bushing and receiving a respective one of said side arms for axial displacement therewith, said side arm support bracket being pivotably connected to said sleeve bushing to permit said pivotal displacement of said side arm in said vertical plane.

7. A positioning apparatus as claimed in claim 6 wherein said side arms are axially displaced in said side arm support bracket by a rack and pinion connection, said pivotal displacement of said side arm support bracket being effectuated by a stepping motor gear coupling.

8. A positioning apparatus as claimed in claim 4 wherein said guide beam is connected to a front end of one of said side arms by an articulated connector fixed to said front end of one of said side arms and adjacent an end of said guide beam, and a slide connector secured for articulation to an end of the other of said side arms with said guide beam retained in sliding longitudinal axial displacement therein.

9. A positioning apparatus as claimed in claim 4 wherein said tool carriage is secured to said guide beam by a sleeve coupling supporting a motor drive for a rack and pinion coupling between said sleeve coupling and said guide beam.

10. A positioning apparatus as claimed in claim 9 wherein said vertically pivotal bushing is a sleeve having a arcuate gear coupling with said sleeve coupling to position and displace said telescopic support member within an arcuate range above and below the longitudinal axis of said vertically pivotal bushing.

11. A positioning apparatus as claimed in claim 10 wherein said telescopic support member is a support arm received in said sleeve and displaceable therein by a motor driven rack and pinion coupling.

12. A positioning apparatus as claimed in claim 4 wherein said attachment means is a gear coupling to attach said tool to a free end of said support member, said gear coupling displacing said tool along a vertical arcuate path, and a further horizontal coupling to displace said tool along an horizontal arcuate path, said couplings being driven by a respective stepping motor.

13. A positioning apparatus as claimed in claim 12 wherein said tool is a dry abrasive paint stripping tool, said tool having a head defining a chamber, said head having an opening in an outer wall thereof, flexible seal means about said opening, one or more dry media abrading jets secured to said head and directing an abrading jet stream toward said head opening, a vacuum conduit connected to said chamber for collecting abrasive particles impinged on said area of said stationary surface and paint particles removed therefrom.

14. A positioning apparatus as claimed in claim 13 wherein said attachment means to secure said tool to said attachment end of said support member comprises a gravity load equalizing adaptor secured between said head and said attachment end.

15. A positioning apparatus as claimed in claim 14 wherein said gravity load equalizing adaptor comprises a pair of spring loaded cylinders telescopically interconnected together by a displaceable connecting mechanism which is actuated by the relative displacement of said cylinders, sensing means to monitor said displaceable connecting mechanism, spring means inside said cylinders to apply pressure to said head connected to one of said cylinders, adjustable spring tension means to control the tension in said spring means, said adjustable spring tension means being controlled by said sensing means to compensate for variations in the load of said head on said adaptor.

16. A positioning apparatus as claimed in claim 15 wherein said one or more abrading jets are adjustably secured to vary and adjust said jet stream at a desired angle relative to the plane of said head opening.

17. A positioning apparatus as claimed in claim 14 wherein said opening in said head is disposed in a straight outer flat wall of said head, said flexible sealing means being formed by a flexible bristle strip positioned about said opening, and a plurality of pressure sensors about said head for engagement with said surface to be stripped to provide reference signals to locate said head outer flat wall relative to said surface whereby said outer flat wall can be oriented substantially parallel to said surface to be stripped.

18. A positioning apparatus as claimed in claim 4 wherein said tool is an aircraft outer skin surface working tool for stripping paint, polishing, washing, inspecting or painting said surface.

19. A positioning apparatus as claimed in claim 18 wherein said support guide frame has a platform on which is located auxiliary equipment associated with said tool, as well as said control means.

20. A positioning apparatus as claimed in claim 19 wherein said control means is a computer control panel having hand-operable controls to control the movement of said tool, and a computer program to command a job function and parameters.

* * * * *